Oct. 27, 1925.

W. B. MESSINK

BALL BEARING CONSTRUCTION

Filed July 6, 1923

1,559,118

W. B. Messink,
Inventor

Patented Oct. 27, 1925.

1,559,118

UNITED STATES PATENT OFFICE.

WILLIAM B. MESSINK, OF CARROLLTON, KENTUCKY.

BALL-BEARING CONSTRUCTION.

Application filed July 6, 1923. Serial No. 649,850.

*To all whom it may concern:*

Be it known that I, WILLIAM B. MESSINK, a citizen of the United States, residing at Carrollton, in the county of Carroll and State of Kentucky, have invented a new and useful Ball-Bearing Construction, of which the following is a specification.

This invention has reference to spindle arm bolts, there being provided novel means whereby the usual spindle arms may be supported in ball bearings to insure the true operation of the spindle arms.

Another object of the invention is to provide a device of this character which will facilitate the guiding of the front wheels of a vehicle and permit the wheels to be moved with the minimum amount of exertion on the part of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
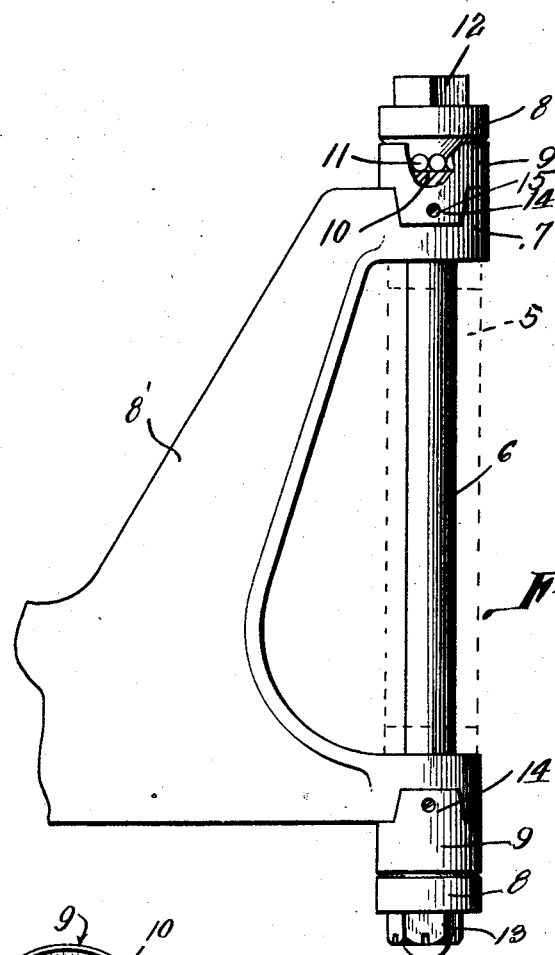
Figure 1 is an elevational view disclosing one end of the front axle of a motor vehicle and showing a bearing constructed in accordance with the invention as applied.
Figure 2:
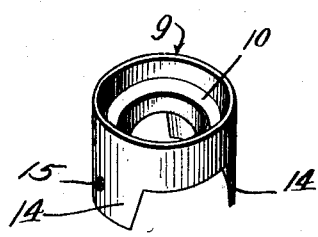
Figure 2 is a perspective view of one of the cone housings.

Referring to the drawing in detail, the reference character 5 designates a spindle at one end of a front axle of a vehicle and on which one of the front wheels of the vehicle is mounted.

As shown, the spindle is supported on the spindle bolt 6 that has its ends positioned in suitable openings formed in the enlargements 7 of the axle 8. The device forming the essence of the invention includes a cone 8 and a cone support 9 which is formed with an inner ball race 10 in which the balls 11 are positioned to be engaged by the cone associated therewith.

At the upper end of the spindle bolt 6, is a squared head 12 to secure the cone and cone race in position, the opposite end of the spindle bolt being threaded to receive the nut 13 operating thereon, the nut acting to move the lower cone 8 into engagement with its cone support. Fingers 14 are formed integral with each cone support and embrace portions of the enlargements 7 to restrict rotary movement of the cone supports with respect to the enlargements after the cones and cone supports have been properly adjusted.

It might be further stated that the cone supports 9 are formed with openings 15 to accommodate securing member 15' whereby the cone supports may be held in various positions of adjustment.

From the foregoing it will be obvious that due to this construction the device may be readily and easily applied to the usual spindle construction, eliminating the necessity of making alterations in the construction to apply the device.

What I claim as new is:—

A ball bearing attachment for use with axles having enlargements at their ends, said attachment including a cup-shaped body portion having a ball race formed therein, depending fingers formed integral with the body portion and adapted to rest on opposite sides of the enlargements, and securing screws adapted to pass through the fingers and engage the enlargements to restrict movement of the body portion.

In testimony that I claim the foregoing as my own, I have hereto affixed my signature.

WILLIAM B. MESSINK.